(12) United States Patent
Todd

(10) Patent No.: US 8,008,811 B2
(45) Date of Patent: Aug. 30, 2011

(54) POWER SUPPLYING UNIT

(76) Inventor: Robert Eugene Todd, Brooklyn, NY (US)

( * ) Notice: Subject to any disclaimer, the term of this patent is extended or adjusted under 35 U.S.C. 154(b) by 245 days.

(21) Appl. No.: 12/078,696

(22) Filed: Apr. 3, 2008

(65) Prior Publication Data

US 2009/0251924 A1 Oct. 8, 2009

(51) Int. Cl.
*G05F 3/04* (2006.01)

(52) U.S. Cl. .............. 307/151; 363/67; 363/68; 363/69; 363/70

(58) Field of Classification Search .................. 307/151; 363/67, 68, 69, 70
See application file for complete search history.

(56) References Cited

U.S. PATENT DOCUMENTS 6,924,567 B2 * 8/2005 Killian et al. .................... 307/46

* cited by examiner

*Primary Examiner* — Rexford N Barnie
*Assistant Examiner* — Hal I Kaplan

(57) ABSTRACT

A power supplying apparatus includes a conversion device to convert direct current (DC) power from a battery set into alternating current (AC) power. A current transformer arrangement may generate a DC charging signal based on the AC power and provide the DC charging signal to the battery set. The current transformer may include a plurality of current transformers.

18 Claims, 3 Drawing Sheets

POWER SUPPLYING UNIT

BACKGROUND

1. Technical Field

Embodiments of the present invention generally relate to a unit for supplying power from a direct current (DC) source. More specifically, embodiments of the present invention relate to a unit for supplying an AC load with electrical power from a battery.

2. Discussion

The DC current supplied by a typical battery may be used to power an AC load. Typically, power supply circuitry converts the DC current made available by the battery into an AC current. Such circuits contain specialized components designed to convert the current supplied from the battery into AC currents with properties suitable for the intended load. For example, the voltage and frequency of the AC current supplied may be made to conform to the requirements of the particular load.

Many power supply circuits exist which are designed to draw DC current from a battery and provide AC current to a load. However, these circuits are typically inefficient, losing a significant portion of the energy contained in the battery to heat generated in the power supply circuitry itself. As a result, larger and more costly batteries are needed for applications where smaller and cheaper batteries would otherwise suffice and batteries must be replaced or recharged more often than with an efficient power supply device.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
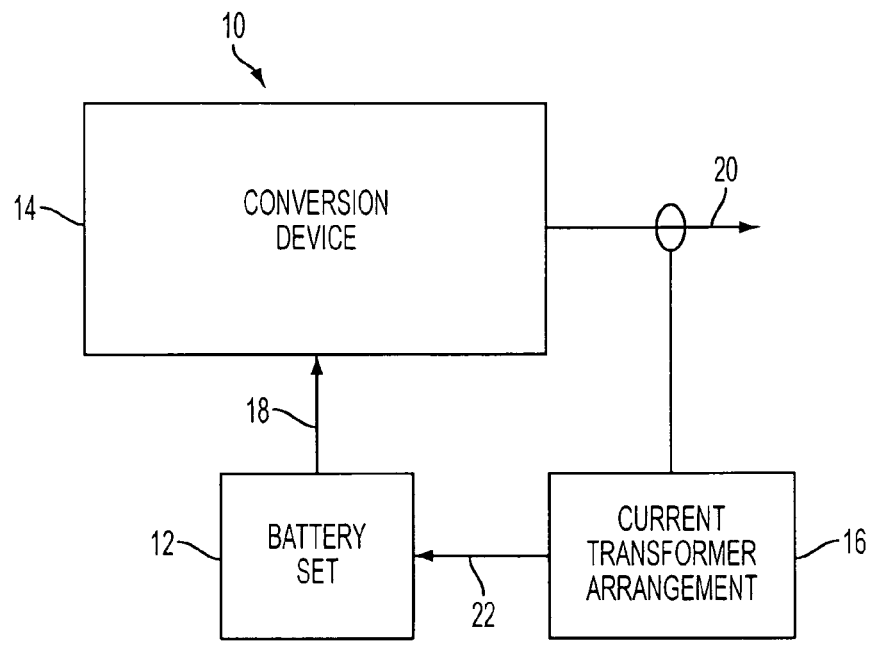
FIG. 1 is a block diagram of an example of a power supplying apparatus according to an embodiment of the of the invention.

Embodiments of the present invention provide for an apparatus that includes a conversion device to convert direct current (DC) power from a battery set into alternating current (AC) power. A current transformer arrangement may generate a DC charging signal based on the AC power and provide the DC charging signal to the battery set.

In other embodiments of the invention, an apparatus includes a battery set to provide DC power and a motor having an input operatively coupled to the battery set and a drive shaft that rotates in response to the DC power. An alternator may be operatively coupled to the drive shaft to generate AC power in response to rotation of the drive shaft and a step up voltage transformer may be operatively coupled to the alternator to magnify the AC power and provide the AC power to a load. The apparatus may also include a first current transformer operatively coupled to the alternator to generate a first AC charging signal based on a first phase of the AC power. A first bridge rectifier can be operatively coupled to the first current transformer to convert the first AC charging signal into a first DC charge. The apparatus may further include a second current transformer operatively coupled to the alternator to generate a second AC charging signal based on a second phase of the AC power. A second bridge rectifier can be operatively coupled to the second current transformer to convert the second AC charging signal into a second DC charge, wherein the first and second DC charges are provided to the battery set as a DC charging signal.

In other embodiments of the invention, an apparatus includes a battery set to provide DC power and an inverter having an input operatively coupled to the battery set and a load output to provide AC power to a load. A step down voltage transformer can have an input operatively coupled to a conversion output of the inverter to reduce the AC power. The apparatus may also include a first current transformer operatively coupled to the step down transformer to generate a first AC charging signal based on a first phase of the reduced AC power. A first bridge rectifier may be operatively coupled to the first current transformer to convert the first AC charging signal into a first DC charge. The apparatus may further include a second current transformer operatively coupled to the step down voltage transformer to generate a second AC charging signal based on a second phase of the reduced AC power. A second bridge rectifier can be operatively coupled to the second current transformer to convert the second AC charging signal into a second DC charge, wherein the first and second DC charges are provided to the battery set as a DC charging signal.

In other embodiments of the invention, a method of supplying power to a load provides for converting DC power from a battery set into AC power. A current transformer arrangement may be used to generate a DC charging signal based on the AC power and the DC charging signal may be provided to the battery set.

In the following description, for the purposes of explanation, numerous specific details are set forth in order to provide a thorough understanding of the embodiments of the present invention. It will be apparent, however, to one skilled in the art that the embodiments of the present invention may be practiced without one or more of these specific details.

Turning now to FIG. 1, a power supplying apparatus 10 is shown, wherein the apparatus 10 includes a battery set 12, a conversion device 14 and a current transformer arrangement 16. In the illustrated example, the conversion device 14 converts DC power 18 from the battery set 12 into AC power 20, which may be provided to a load (not shown). The illustrated current transformer arrangement 16 generates a DC charging signal 22 based on the AC power 20, wherein the DC charging signal 22 from the current transformer arrangement 16 can be provided to the battery set 12. The DC charging signal 22 may increase the operational life span of the battery set 12, improve the overall efficiency of the apparatus 10 and enable much larger loads to be driven by the battery set 12.

Figure 2:
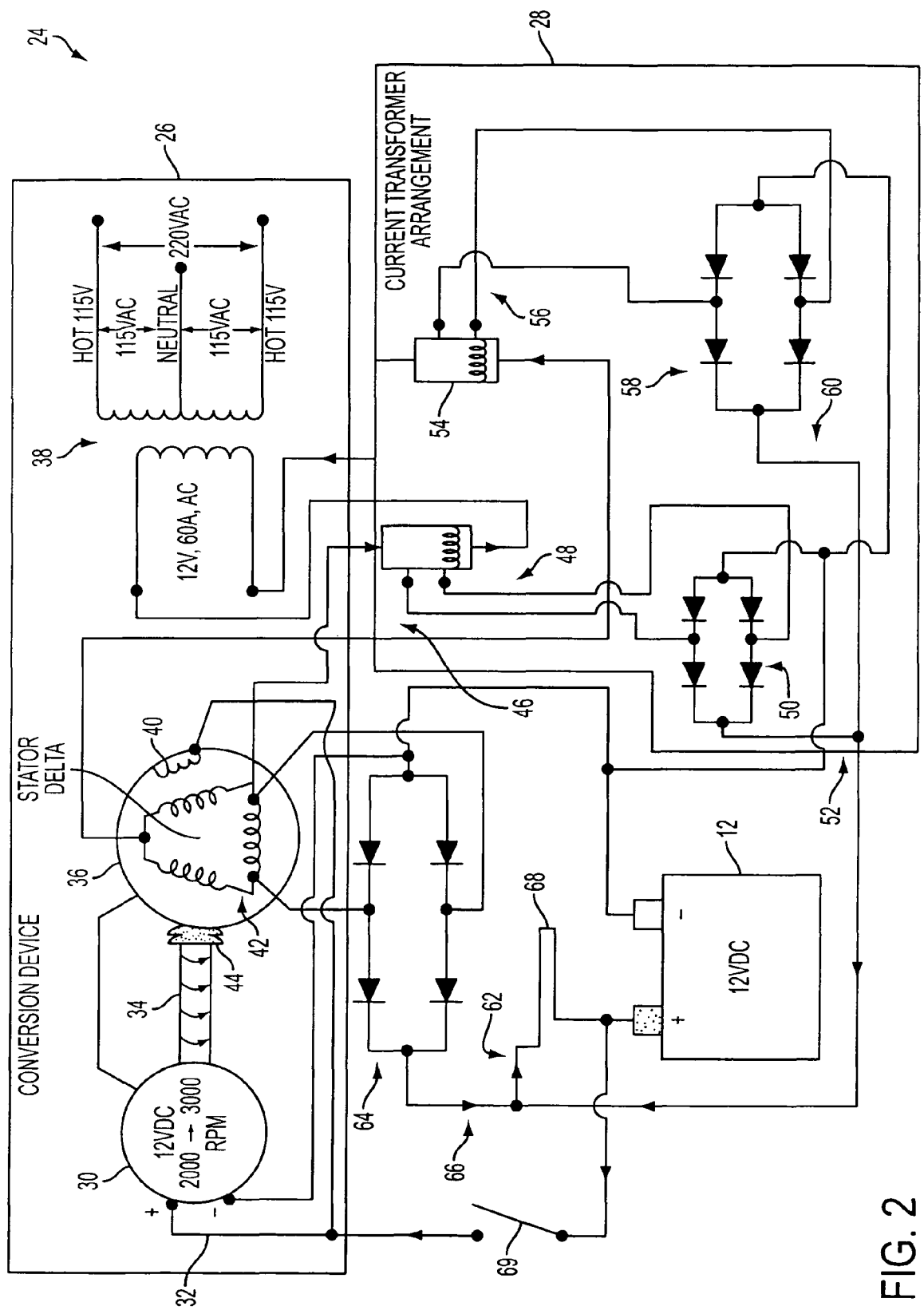
FIG. 2 is a schematic diagram of an example of a power supplying apparatus having a conversion device with a motor according to an embodiment of the invention.

FIG. 2 shows one approach to a power supplying apparatus 24 in greater detail. Certain circuit elements and components of the apparatus 24 and other apparatuses described herein have been omitted so as not to obscure more relevant aspects of the embodiments of the present invention. For example, circuit protection diodes, capacitors, resistors, light emitting diodes (LEDs), displays and other components may be readily added to the apparatus 24 to enhance performance. In the illustrated example, the apparatus 24 generally includes a conversion device 26, a current transformer arrangement 28 and the battery set 12. In particular, the conversion device 26 may have a motor 30 with an input 32 operatively coupled to the battery set 12 and a drive shaft 34 that rotates in response to DC power from the battery set 12. The illustrated motor is rated at 12V DC, with 2000-3000 RPM, although other values and ratings may be used, depending upon the circumstances. A clutch 44 can be coupled to the drive shaft 34 to reduce torque resulting from rotation of the drive shaft 34. The illustrated conversion device 26 also includes an alternator 36 operatively coupled to the drive shaft 34 to generate AC power in response to rotation of the drive shaft 34. In particular, the alternator 36 may have a field coil 40 operatively coupled to the DC power from the battery set 12 and a stator coil 42 to generate the AC power based on the rotation of the drive shaft 34 and the DC power in the field coil 40.

In one embodiment, the alternator 36 is a three-phase alternator capable of generating 90 A, AC (30 A per phase). The alternator 36 may also provide the AC power to the current transformer arrangement 28, which is discussed in greater detail below. The conversion device 26 may further include a step up voltage transformer 38 operatively coupled to the alternator 36 to magnify the AC power and provide the magnified AC power to a load. In the illustrated example, the primary winding of the step up voltage transformer is rated at 12V, 60 A, AC, and the secondary winding is capable of providing two 115V AC outputs for a total of 220V AC rail-to-rail. Other values and ratings may be used.

The illustrated current transformer arrangement 28 includes a first current transformer 46 operatively coupled to the alternator 36 of the conversion device 26 to generate a first AC charging signal 48 based on a first phase of the AC power from the alternator 36. In particular, the first current transformer 46 may include a conductor wrapped several times around a ring having an inner diameter through which a conductor running from the stator coil 42 of the alternator 36 to the primary side of the step up voltage transformer 38 passes. A first bridge rectifier 50 may be operatively coupled to the first current transformer 46 to convert the first AC charging signal into a first DC charge 52. A second current transformer 54 may also be operatively coupled to the alternator 36 of the conversion device 26 to generate a second AC charging signal 56 based on a second phase of the AC power from the alternator 36. In particular, the second current transformer 54 may include a conductor wrapped several times around a ring having an inner diameter through which a conductor running from the stator coil 42 of the alternator 36 to the primary side of the step up voltage transformer 38 passes. A second bridge rectifier 58 may be operatively coupled to the second current transformer 54 to convert the second AC charging signal 56 into a second DC charge 60. As already noted, a DC charging signal 62 can include the first and second DC charges 52, 60.

The current transformers 46, 54, may be of the type commonly used in metering and protective relaying in the electrical power industry. The most common design of such a current transformer includes a length of wire wrapped many times around a silicon steel ring passed over the circuit being measured. The primary circuit of the current transformers 46, 54 may therefore be made up of a single "turn" of conductor, with a secondary of many hundreds of turns. The current transformers 46, 54 can act as constant-current series devices with an apparent power burden a fraction of that of the high voltage primary circuit. Hence, the primary circuit is largely unaffected by the insertion of the current transformers 46, 54. As a result, the current transformer arrangement 28 provides a unique and effective mechanism for generating a substantial battery charge without negatively impacting the delivery of power to the load.

Care may be taken that the secondary of the current transformer 46, 54 is not disconnected from their loads while current is flowing in the primary, as this can produce a dangerously high voltage across the open secondary. In one embodiment, a protective enclosure is provided around the current transformer arrangement 28 and/or apparatus 24 to facilitate such safety precautions. The number of current transformers 46, 54 in the current transformer arrangement 28 may also vary depending upon the charging needs of the apparatus 24, load and/or battery set 12.

The illustrated apparatus 24 also includes a third bridge rectifier 64 operatively coupled to the alternator 36 of the conversion device 26 to generate a third DC charge 66 based on a third phase of the AC power from the alternator 36. A charging switch such as thermal switch 68 may be operatively coupled to the battery set 12 and the first second and third bridge rectifiers 50, 58, 64, to selectively provide the DC charging signal to the battery set 12. Other charging switch configurations, such as voltage regulation and/or electrical switching configurations may also be used. The illustrated apparatus 24 also includes an on/off switch 69 to enable/disable the apparatus 24.

Figure 3:
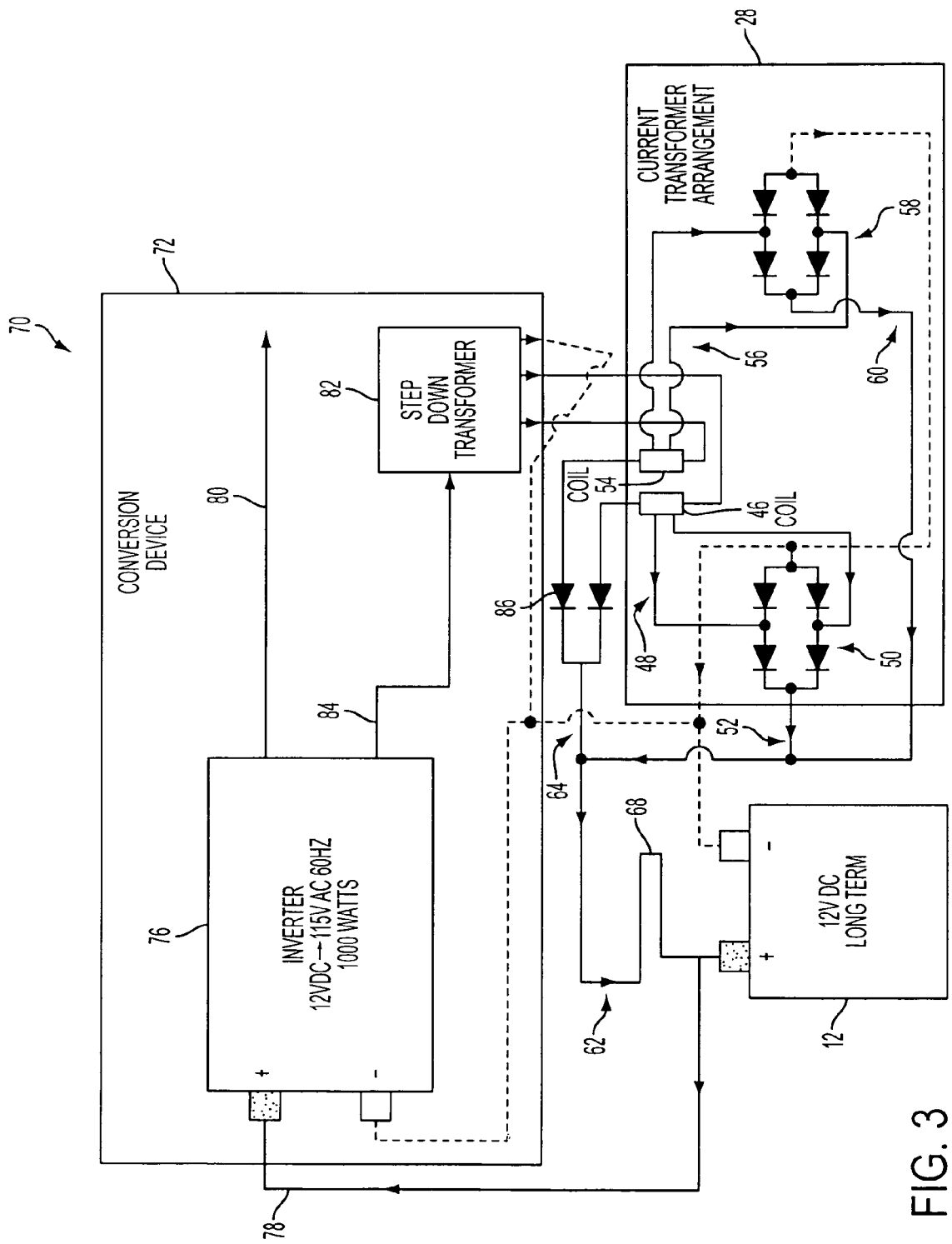
FIG. 3 is a schematic diagram of an example of a power supplying apparatus having a conversion device with an inverter according to an embodiment of the invention.

FIG. 3 shows another approach to a power supplying apparatus 70 in greater detail. In the illustrated example, the apparatus 70 generally includes a conversion device 72, the current transformer arrangement 28 and the battery set 12. In particular, the illustrated example, the conversion device 72 has an inverter 76 with an input 78 operatively coupled to the battery set 12 and a load output 80 to provide AC power generated by the inverter 76 to a load. The inverter 76 may be rated at 12V DC, with an output of 115V AC, 1 kW, 60 Hz, although other values and ratings may be used. A step down voltage transformer 82 may have an input operatively coupled to a conversion output 84 of the inverter 76 to reduce the AC power and provide the reduced AC power to the current transformer arrangement 28. In one embodiment, the step down voltage transformer 82 can convert the 115V AC feed from the inverter 76 down to 12V AC, three phases.

As already noted, the illustrated current transformer arrangement 28 includes a pair of current transformers 46, 54 and a corresponding pair of bridge rectifiers 50, 58. In this example, the first current transformer 46 is operatively coupled to the step down voltage transformer 82 to generate the first AC charging signal 48 based on a first phase of the reduced AC power. The first bridge rectifier 50 may be operatively coupled to first current transformer 46 to convert the first AC charging signal 48 into the first DC charge 52. The illustrated second current transformer 54 is operatively coupled to the step down voltage transformer 82 to generate the second AC charging signal 56 based on a second phase of the reduced AC power. The second bridge rectifier 58 can be operatively coupled to the second current transformer 54 to convert the second AC charging signal 56 into the second DC charge 60. The first and second DC charges 52, 60, may be combined with a third DC charge 64 from an isolation rectifier 86 into the DC charging signal 62. The illustrated isolation rectifier 86, whose diodes may be mounted to a heat sink, is operatively coupled to the step down voltage transformer 82 to generate the third DC charge 64 based on the third phase of the reduced AC power. As already noted, a charging switch such as thermal switch 68 may be operatively coupled to the battery set 12, the isolation rectifier 86 and the first and second bridge rectifiers 50, 58, to selectively provide the DC charging signal 62 to the battery set 12.

Figure 4:
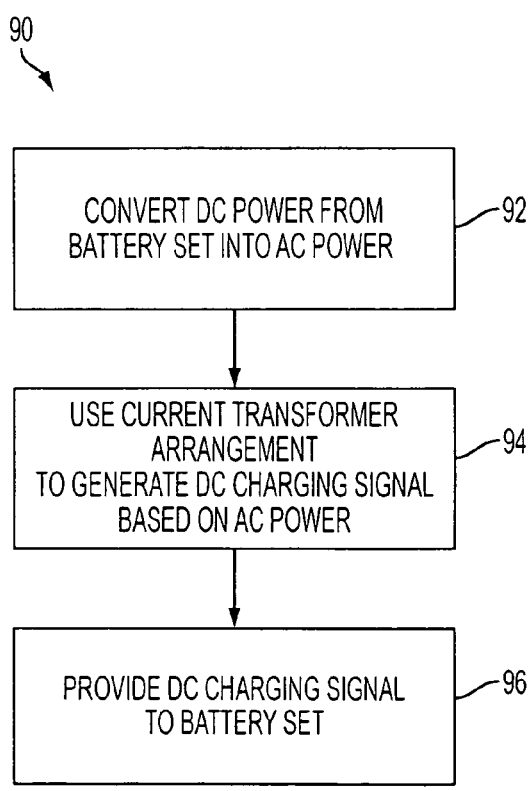
FIG. 4 is a flowchart of an example of a method of supplying AC power to a load according to an embodiment of the invention.

FIG. 4 shows a method 90 of supplying AC power to a load. The method 90 may be implemented in a power supplying apparatus as hardware, software, firmware, or any combination thereof. Illustrated processing block 92 provides for converting DC power from a battery set into AC power. A current transformer arrangement may be used in block 94 to generate a DC charging signal based on the AC power, and in block 96 the DC charging signal may be provided to the battery set.

The battery set 12 (FIGS. 1-3) described herein may include a 12V DC gel-type battery (also known as a "gel cell"), which is a rechargeable valve regulated lead-acid battery with a gelified electrolyte. Unlike a traditional wet-cell lead-acid battery, these batteries may not need to be kept upright (though they may not be chargeable while inverted). In addition, gel batteries can virtually eliminate the electrolyte evaporation, spillage (and subsequent corrosion issues) common to the wet-cell battery, and may boast greater resistance to extreme temperatures, shock, and vibration. As a result, they are primarily used in automobiles, boats, aircraft, and other motorized vehicles. These batteries are often colloquially referred to as sealed lead-acid (SLA) batteries due to their non-leaking containers, but they may not be completely sealed; the valve regulation system allows for gas to be expelled. Chemically, they are the same as wet (non-sealed) batteries except that the antimony in the lead plates is replaced by calcium. This preserves the mechanical characteristics but renders the construction far less prone to gassing. The battery type is also sometimes referred to as a Lead-Calcium battery. While some embodiments of the present invention may be described with respect to gel cells, it is important to note that the embodiments of the present invention are not so limited. In fact, any rechargeable DC source can benefit from the techniques described herein and specific examples are used to facilitate discussion only. Notwithstanding, there are a number of particular benefits provided by gel cells for which embodiments of the present invention are uniquely suited.

The terms "connected", "coupled" and "attached" are used herein to refer to any type of relationship, direct or indirect, between the components in question, and may apply to electrical, mechanical, radio frequency (RF), optical or other couplings. In addition, the term "first", "second", and so on are used herein only to facilitate discussion, and do not necessarily infer any type of temporal or chronological relationship.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specifications, and following claims.

What is claimed is:

1. An apparatus comprising:
a conversion device to convert direct current (DC) power from a battery set into alternating current (AC) power, and
a current transformer arrangement to generate a DC charging signal based on the AC power and provide the DC charging signal to the battery set;
wherein the current transformer arrangement includes:
a first current transformer operatively coupled to the conversion device to generate a first AC charging signal based on a first phase of the AC power;
a bridge rectifier operatively coupled to the first current transformer to convert the first AC charging signal into a first DC charge;
a second current transformer operatively coupled to the conversion device to generate a second AC charging signal based on a second phase of the AC power; and
a second bridge rectifier operatively coupled to the second current transformer to convert the second AC charging signal into a second DC charge, wherein the DC charging signal includes the first and second DC charges.

2. The apparatus of claim 1, further including:
a third bridge rectifier operatively coupled to an alternator of the conversion device to generate a third DC charge based on the AC power from the alternator, the DC charging signal to further include the third DC charge; and
a charging switch operatively coupled to the battery set and the first, second and third bridge rectifiers to selectively provide the DC charging signal to the battery set.

3. The apparatus of claim 1, further including:
an isolation rectifier operatively coupled to a step down voltage transformer of the conversion device to generate a third DC charge based on the AC power from the step down voltage transformer, the DC charging signal to further include the third DC charge; and
a charging switch operatively coupled to the battery set, the isolation rectifier the first and second bridge rectifiers to selectively provide the DC charging signal to the battery set.

4. An apparatus comprising:
a conversion device to convert direct current (DC) power from a battery set into alternating current (AC) power, and
a current transformer arrangement to generate a DC charging signal based on the AC power and provide the DC charging signal to the battery set; wherein
the conversion device includes:
a motor having an input operatively coupled to the battery set and a drive shaft that rotates in response to the DC power;
an alternator operatively coupled to the drive shaft to generate the AC power in response to rotation of the drive shaft and provide the AC power to the current transformer arrangement; and
a step up voltage transformer operatively coupled to the alternator to magnify the AC power and provide the magnified AC power to a load.

5. The apparatus of claim 4, wherein the alternator includes:
a field coil operatively coupled to the DC power from the battery set; and
a stator coil to generate the AC power based on the rotation of the drive shaft and the DC power in the field coil.

6. The apparatus of claim 4, further including a dutch coupled to the drive shaft to reduce torque resulting from rotation of the drive shaft.

7. An apparatus comprising:
a conversion device to convert direct current (DC) power from a battery set into alternating current (AC) power, and
a current transformer arrangement to generate a DC charging signal based on the AC power and provide the DC charging signal to the battery set; wherein
the conversion device includes;
a inverter having an input operatively coupled to the battery set and a load output to provide the AC power to a load; and
a step down voltage transformer having an input operatively coupled to a conversion output of the inverter to reduce the AC power and provide the reduced AC power and provide the reduced AC power to the current transformer arrangement.

8. An apparatus comprising:
a battery set provide direct current (DC) power;
a motor having an input operatively coupled to the battery set and a drive shaft that rotates in response to rotation of the drive shaft;
a step up voltage transformer operatively coupled to the alternator to magnify the AC power and provide the magnified AC power to a load;
a first current transformer operatively coupled to the alternator to generate a first AC charging signal based on a first phase of the AC power;
a second current transformer operatively coupled to the alternator to generate a second AC charging signal based on a second phase of the AC power, and
a second bridge rectifier operatively coupled to the second current transformer to convert the second AC charging signal into a second DC charge, wherein the first and second DC charges are to be provided to the battery set as a DC charging signal.

9. The apparatus of claim 8, further including a third bridge rectifier operatively coupled to the alternator to generate a third DC charge based on a third phase of the AC power, the DC charging signal to further include the third DC charge.

10. The apparatus of claim 9, further including a charging switch operatively coupled to the battery set and the first, second and third bridge rectifiers to selectively provide the DC charging signal to the battery set.

11. The apparatus of claim 10, wherein the charging switch includes a thermal switch.

12. The apparatus of claim 8, wherein the alternator includes:
a field coil operatively coupled to the DC power from the battery set; and
a stator coil to generate the AC power based on the rotation of the drive shaft and the DC power in the field coil.

13. The apparatus of claim 12, further including a clutch coupled to the drive shaft to reduce torque resulting from rotation of the drive shaft.

14. An apparatus comprising:
a battery set to provide direct current (DC) power;
an inverter having an input operatively coupled to the battery set and a load output to provide alternating current (AC) power to a load;
a step down voltage transformer having an input operatively coupled to a conversion output of the inverter to reduce the AC power;
a first current transformer operatively coupled to the step down voltage transformer to generate a first AC charging signal based on a first phase of the reduced AC power;
a first bridge rectifier operatively coupled to the first current transformer to convert the first AC charging signal into a first DC charge;
a second current transformer operatively coupled to the step down voltage transformer to generate a second AC charging signal based on a second phase of the reduced AC power; and
a second bridge rectifier operatively coupled to the second current transformer to convert the second AC charging signal into a second DC charge, wherein the first and second DC charges are to be provided to the battery set as a DC charging signal.

15. The apparatus of claim 14, further including:
an isolation rectifier operatively coupled to the step down voltage transformer to generate a third DC charge based on a third phase of the reduced AC power, the DC charging signal to further include the third DC charge; and
a charging switch operatively coupled to the battery set, the isolation rectifier and the first and second bridge rectifiers to selectively provide the DC charging signal to the battery set.

16. The apparatus of claim 14, wherein the charging switch includes a thermal switch.

17. A method comprising:
converting direct current (DC) power from a battery set into alternating current (AC) power; using a current transformer arrangement to generate a DC charging signal based on the AC power, and providing the DC charging signal to the battery set;
wherein using the current transformer arrangement to generate the DC charging signal includes;
using a first current transformer to generate a first AC charging signal based on a first phase of the AC power;
converting the first AC charging signal into a first DC charge;
using a second current transformer to generate a second AC charging signal based on a second phase of the AC power; and
converting the second AC charging signal into a second DC charge, wherein the DC charging signal includes the first and second DC charges.

18. The method of claim 17, further including:
generating a third DC charge based on the AC power, wherein the DC charging signal further includes the third DC charge; and
selectively providing the DC charging signal to the battery set.

* * * * *